United States Patent [19]

Matsumoto et al.

[11] Patent Number: 4,748,861

[45] Date of Patent: Jun. 7, 1988

[54] ELECTRONIC DISPLAY MEASURING DEVICE

[75] Inventors: Toshiyuki Matsumoto; Shigeru Ohtani, both of Kawasaki, Japan

[73] Assignee: Mitutoyo Mfg. Co., Ltd., Tokyo, Japan

[21] Appl. No.: 934,218

[22] Filed: Nov. 21, 1986

[30] Foreign Application Priority Data

Nov. 22, 1985 [JP] Japan .................. 60-263392
Nov. 22, 1985 [JP] Japan .................. 60-263393

[51] Int. Cl.$^4$ ............................................. G01D 7/00
[52] U.S. Cl. ............................... 73/866.3; 340/713
[58] Field of Search ............... 73/866.3, 866.1, 865.9; 340/713

[56] References Cited

U.S. PATENT DOCUMENTS

| | | | |
|---|---|---|---|
| 3,889,540 | 6/1975 | Widmer | 73/866.1 |
| 4,427,882 | 1/1984 | Nakaoki | 250/231 SE |
| 4,464,933 | 8/1984 | Santis | 73/866.3 |
| 4,607,527 | 8/1986 | Sears | 73/866.1 |

FOREIGN PATENT DOCUMENTS 3141392 5/1982 Fed. Rep. of Germany .
3440221 5/1986 Fed. Rep. of Germany .

*Primary Examiner*—Tom Noland
*Attorney, Agent, or Firm*—Flynn, Thiel Boutell & Tanis

[57] ABSTRACT

A measuring device provided with an electronic display for displaying a measured value has a main body composed of two members which are rotatable relative to each other. A plurality of switch elements which enable selection of a desired measuring factor are provided on portions of the main body through which the two members rotate relative to each other. The selection of a switch element is effected on the basis of the fact that the switch element stays in a connected state for a predetermined period of time, or by actuating a selector button. The result of measurement is displayed on the electronic display in digital and/or analog form.

9 Claims, 8 Drawing Sheets

ELECTRONIC DISPLAY MEASURING DEVICE

BACKGROUND OF THE INVENTION

1. Field of the Invention

The present invention relates to an electronic display measuring device which incorporates an encoder which is adapted to convert a variable into an electric signal and which further has an electronic display for displaying a measured value in digital and/or analog form. The present invention may be applied to general measuring devices such as length measuring devices, e.g., dial gauges and slide calipers, which are equipped with electronic displays, as well as weight, temperature and speed measuring devices.

2. Description of the Prior Art

One type of measuring device for measuring length, thickness, width, weight, speed and the like has heretofore been known in which, as shown in FIG. 10, the movement of a spindle 51 which is slidably provided on the main body is detected through a sensor 52 and converted into an electric signal by an encoder 53 incorporated in the main body, and a measuring factor is specified by a switch 54 through a controller 55, thus displaying a measured value on an electronic display 56 in analog and/or digital form. This type of measuring device has various advantages such as a high degree of measuring accuracy and an ease of reading and has therefore been widely applied.

In the above-described type of conventional measuring device, a large number of switches are provided for the purpose of obtaining maximum, minimum and mean values of measured values, clearing and holding a displayed value, changing the expression of units between inch and millimeter and turning on/off a power supply, and the number of switches is increasing with an increase in number of functions of this type of measuring device.

On the other hand, as the range of their application enlarges, measuring devices are demanded in these days to have reduced sizes so as to be used as portable or inprocess devices. Such demand is sufficiently met with respect to built-in elements such as encoders owing to the development of electronic technology, but reduction in size of switches is disadvantageously limited to a certain extent. More specifically, in view of the size of operators' fingers and operability, switches 57 need to have a certain size and it is necessary to provide a large number of switches 57 in the vicinity of a display and, particularly, on the same plane as a display screen 58, as shown in FIG. 11, which means that the size of a measuring device 59 as a whole is determined by the number and size of switches 57. On the other hand, if the overall size of the device 59 and the size of each switch 57 are limited, the area for the display screen 58 is restricted, and this leads to various problems: namely, it becomes difficult to read a measured value; it becomes impossible to simultaneously display various kinds of data; and it is difficult to additionally provide functions which enable display of an index, measuring procedure, decision of pass-fail judgement, etc. Accordingly, the prior art involves the problem that the existence of switches disadvantageously limits the size of the display screen on the main body.

SUMMARY OF THE INVENTION

In view of the above-described circumstances, it is a primary object of the present invention to provide an electronic display measuring device designed to enable enlargement in the area for the display screen on the main body.

To this end, the present invention provides an electronic display measuring device comprising: a main body including a first member provided with an encoder, and a second member provided on its outer end surface with an electronic display, the first and second members being rotatable relative to each other so that the position of the electronic display is changeable; and a switch for controlling the encoder and/or the electronic display, the switch being provided so as to be actuated by utilizing a circumferential displacement between the first and second members which is caused when these members are rotated relative to each other. With the above-described arrangement, the number of control buttons provided on the outer end surface of the second member is reduced, or said outer end surface is cleared of control buttons, thus attaining the above-described object.

DETAILED DESCRIPTION OF THE PREFERRED EMBODIMENTS

Preferred embodiments of the present invention will be described hereinunder in detail with reference to the accompanying drawings.

FIGS. 1 to 6 show in combination a first embodiment of the present invention.

Figure 1:
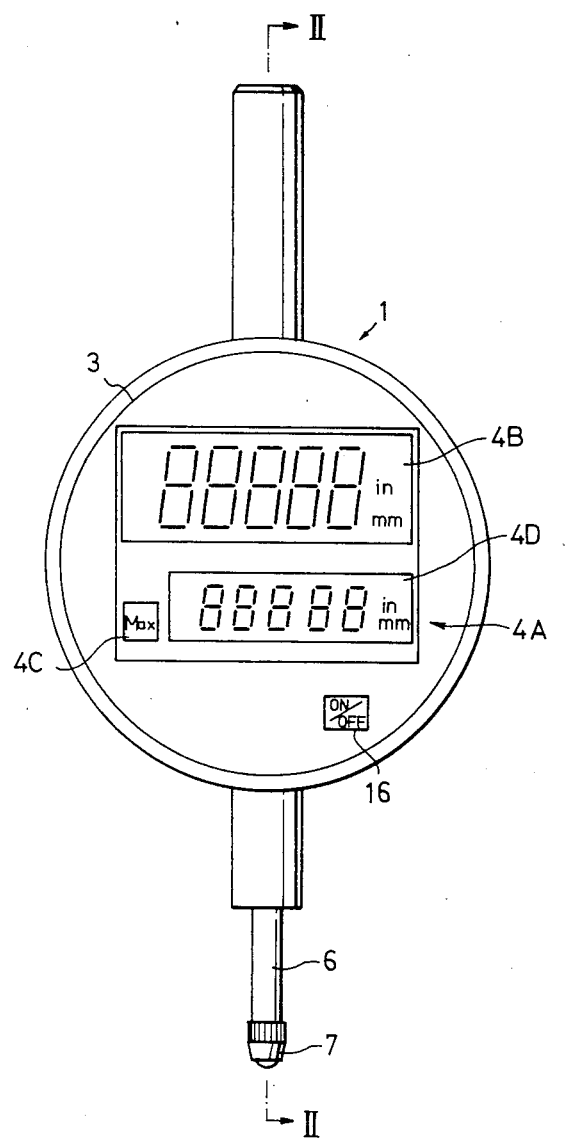
FIG. 1 is a front view of a first embodiment of the present invention.
Figure 2:
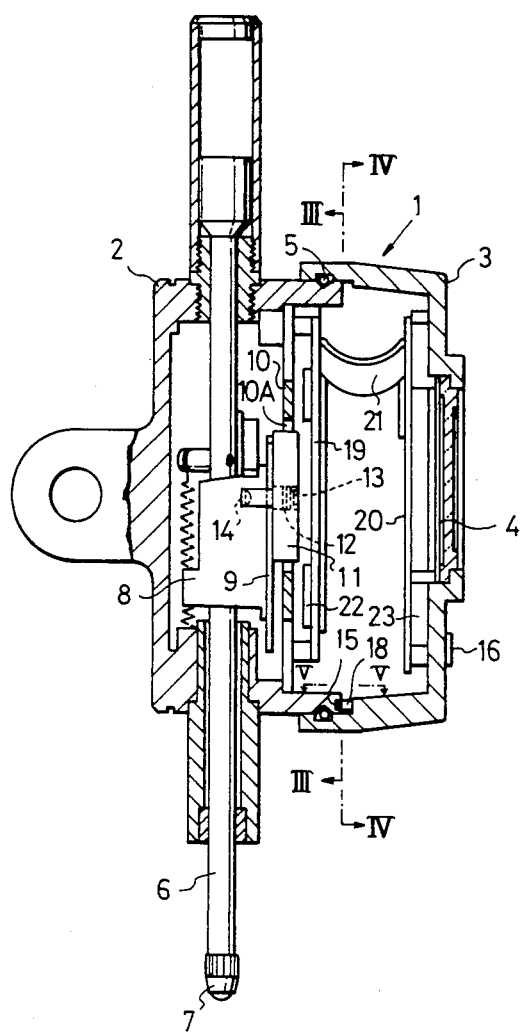
FIG. 2 is a sectional view taken along the line II—II in FIG. 1.

Referring first to FIGS. 1 and 2, a dial gauge, as one example of the electronic display measuring device according to the present invention, has a main body 1 which includes a first member 2 and a second member 3 each having a cylindrical portion with one open end surface. The second member 3 is provided with an electronic display 4 for digitally displaying a measured value. A V-groove is formed along the outer peripheral surface of the cylindrical portion of the first member 2, while a U-groove is formed along the inner peripheral surface of the cylindrical portion of the second member 3, and an O-ring 5 is interposed in a space defined by the V- and U-grooves, whereby the first and second members 2 and 3 are connected in such a manner as to be rotatable relative to each other so that the position of the electronic display 4 is changeable. In this arrangement, the center of relative rotation between the first and second members 2 and 3 is determined by the center of a circle which is defined by, for example, the U-groove. Therefore, there are cases where the center of said relative rotation is not coincident with the center of the first member 2 and/or the second member 3.

Figure 3:
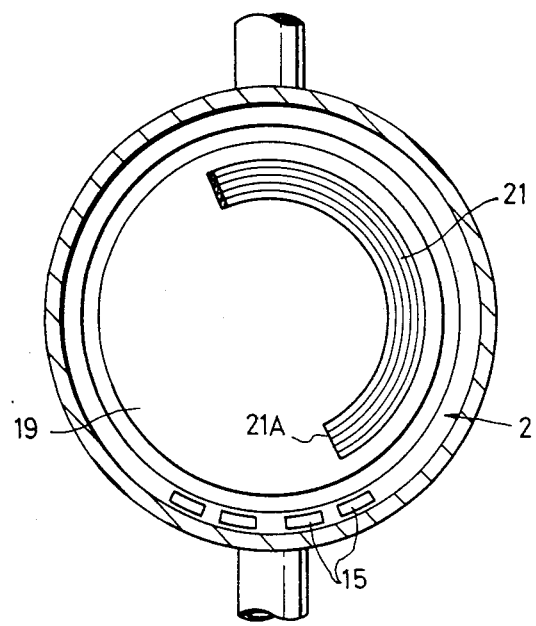
FIGS. 3, 4 and 5 are sectional views respectively taken along the lines III—III, IV—IV and V—V in FIG. 2.

A spindle 6 is slidably supported by the first member 2. A measuring element 7 is provided at the lower end of the spindle 6, and a scale mounting plate 8 is mounted at a substantially central portion of the spindle 6 which is positioned within the first member 2. A main scale 9 is mounted on the scale mounting plate 8 in such a manner as to extend parallel to the axis of the spindle 6. A retaining member 10 is rigidly secured to the inner wall of the first member 2 on the side thereof which is closer to one end surface thereof. A holder 11 is retained by a notched portion 10A formed in the substantially central portion of the retaining member 10. The holder 11 has an index scale 12 and a light receiver 13 provided at a position which faces an optical lattice plane of the main scale 9. It should be noted that the index scale 12 is also provided with an optical lattice corresponding to the optical lattice of the main scale 9. A light emitter 14 is rigidly secured to the retaining member 10 at a position which faces the light receiver 13 across the main scale 12. As also shown in FIG. 3, a predetermined number of switch elements 15 are provided on the inner end surface of the first member 2 in such a manner that they are arranged on a circular locus with its center at the center of relative rotation between the first and second members 2 and 3. The switch elements 15 are adapted to take charge of appropriate measuring factors, respectively, such as changing the expression of units between inch and millimeter, changing the calculating modes between addition (+) and subtraction (−), presetting a value, holding a measured value, obtaining a maximum value (Max), obtaining a minimum value (Min) and displaying decision of pass-fail judgement. Although the example illustrated in FIG. 3 is arranged such that four switch elements 15 can be selected due to the convenience of explanation, the number of switch elements may be selected as desired.

On the other hand, the second member 3 has a display screen 4A of the electronic display 4 which is formed in the center of the front surface as shown in FIG. 1, so that a measured value obtained on the basis of the amount of movement of the spindle 6 is digitally displayed on the display screen 4A by the operation of the electronic display 4. A power ON/OFF switch 16 is provided on the lower part of the front surface of the second member 3. As will be clear from FIG. 1, the display screen 4A is enlarged as compared with the conventional display screens, and is composed of a first display section 4B for effecting real-time display of a measured value which varies in accordance with the displacement of the spindle 6, a factor display section 4C for displaying by liquid crystal a selected one of the above-described measuring factors except for the inch-/millimeter changing function, and a second display section 4D for displaying a measured value obtained in accordance with the selected measuring factor. The display screen 4A is arranged such that a selected unit can be displayed as "in" or "mm" on the right-hand side of each of the first and second display sections 4B and 4D.

Figure 4:
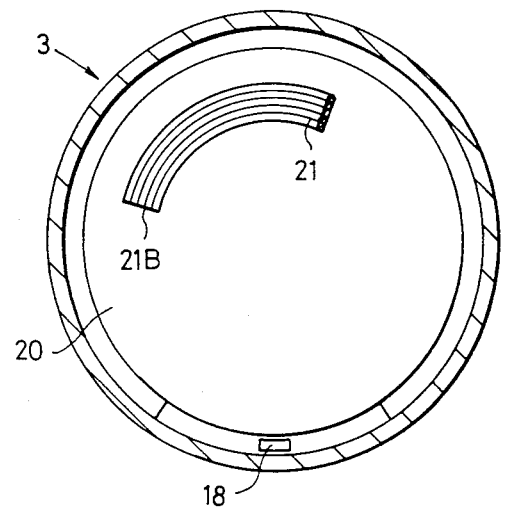
Figure 5:
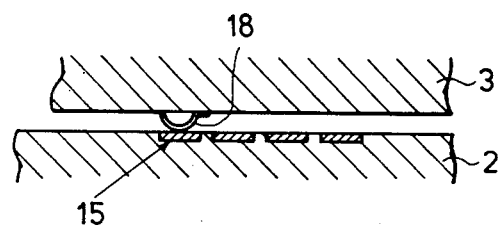

As also shown in FIG. 4, a drive contact 18 is provided on the inner end surface of the second member 3 so that the drive contact 18 is selectively connected to the switch elements 15 in response to the circumferential displacement between the first and second members 2 and 3 which is caused when they are rotated relative to each other. The connection between one of the switch elements 15 and the drive contact 18 is effected in such a manner that, as shown in FIG. 5, the convex distal end of the drive contact 18 projecting from the second member 3 is brought into contact with one of the switch elements 15 buried in the first member 2.

Two parallel boards 19 and 20 are rigidly secured to the first and second members 2 and 3, respectively, and a flat cable 21 which defines a belt-shaped wiring is provided between the boards 19 and 20. The flat cable 21 is composed of a plurality of parallel wires arranged in a beltlike shape which has a predetermined curvature equal to that of the above-described circular locus (see FIGS. 3 and 4). In assembly, the flat cable 21 is reversed at the intermediate portion thereof, and one end 21A of the cable 21 is rigidly secured to a portion of the board 19 on the first member 2 which portion is located on said circular locus, and the other end 21B is rigidly secured to a portion of the board 20 on the second member 3 which is located on said circular locus. First and second electrical equipments 22 and 23 which are respectively secured to the boards 19 and 20 are respectively connected to the ends 21A and 21B of the flat cable 21, thereby allowing the electrical equipments 22 and 23 to be electrically connected to each other.

Figure 6:
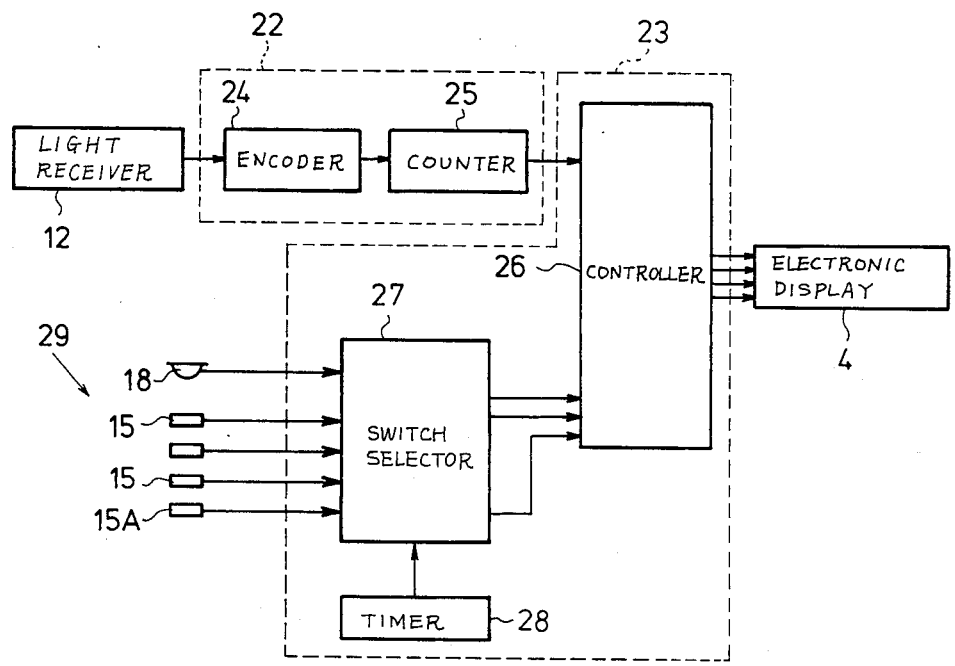
FIG. 6 is a block diagram showing the first embodiment.

The first electrical equipment 22 is connected to the light receiver 12 and includes an encoder 24 and a counter 25, while the second electrical equipment 23 includes a controller 26, a switch selector and a timer 28, as shown in the block diagram of FIG. 6. The encoder 24 converts a signal representing an amount of displacement of the spindle 6 sent from the light receiver 12 into an electric signal, encodes the signal and delivers the encoded signal to the counter 25. The counter 25 counts the number of encoded signals and delivers its output to the controller 26. The controller 26 delivers a signal to the electronic display 4, whereby a measured value varying with the displacement of the spindle 6 is displayed on the first display section 4B in the display screen 4A. The timer 28 is connected to the switch selector 27 which, in turn, is connected to the drive contact 18 and the switch elements 15. When the drive contact 18 and any one of the switch elements 15 are connected together, the switch selector 27 delivers a signal to the electronic display 4 through the controller 26, said signal activating the display section 4C in the display screen 4A to display the function of the switch element 15 concerned. When the timer 28 detects the fact that the drive contact 18 has stayed on the switch element 15 for a predetermined period of time, the switch selector 27 selects this switch element 15 and delivers a signal to the electronic display 4 through the controller 26, said signal activating the second display section 4D in the display screen 4A to display a measured value obtained on the basis of a measuring factor corresponding to the selected switch element 15. Thus, one switch 29 is defined by a combination of each switch element 15 and the drive contact 18. This switch 29 is arranged such that, when one switch element 15 is selected, the switch 29 is activated, and when another switch element 15 is selected, a measured value which has been displayed on the basis of the function of the first selected switch element 15 is cleared from the second display section 4D in the display screen 4A, and a measured value in accordance with the function of the newly selected element switch 15 is displayed instead, thus enabling control of the electronic display 4. The switch elements 15 include an inch/millimeter changing switch element 15A which is adapted such that, when it is selected by being connected to the drive contact 18, either inch or millimeter is selected as desired, and a measured value obtained at that time and "in" or "mm" are displayed on each of the first and second display sections 4B and 4D.

The following is a description of the operation of the electronic display measuring device in accordance with this embodiment arranged as detailed above.

First, the power switch 16 is turned ON, and the measuring element 7 of the spindle 6 is brought into contact with an object of measurement (not shown). In consequence, a measured value which varies with the displacement of the spindle 6 is displayed on the first display section 4B in the display screen 4A.

Then, one switch 29 is activated. To select, for example, the maximum (Max) switch element 15, the first and second members 2 and 3 are rotated relative to each other to connect the drive contact 18 to a switch element 15 concerned. Thus, "Max" is displayed by liquid crystal on the display section 4C in the display screen 4A. When the drive contact 18 stays on the Max switch element 15 for a predetermined period of time, the timer 28 detects this fact and activates the switch selector 27 to deliver a signal to the electronic display 4 through the controller 26. In this way, the Max switch element 15 is selected, and a maximum measured value is displayed on the second display section 4D in the display screen 4A.

When it is desired to obtain, for example, a minimum measured value, the first and second members 2 and 3 are rotated relative to each other to connect the drive contact 18 to the minimum (Min) switch element 15. In consequence, "Min" is displayed on the display section 4C in the display screen 4A. When the drive contact 18 stays on the Min switch element 15 for a predetermined period of time, this fact is detected by the timer 28, and in place of the maximum measured value, a minimum measured value is displayed on the second display section 4D in the display screen 4A through the switch selector 27 and the like in a manner similar to the above.

As described above, according to the first embodiment, the switch elements 15 and the drive contact 18 are circumferentially provided on the first and second members 2 and 3, respectively. Therefore, it is possible to reduce the number of control buttons provided on the outer end surface of the second member 3, so that the display screen 4A can be enlarged for a particular overall size of the main body 1. Enlargement in area of the display screen 4A facilitates reading of a measured value and also enables simultaneous display of various kinds of data and addition of display functions, thus allowing enlargement of the functional capacity of the device. In other words, when the display screen 4A has the same area as that of the conventional one, the size of the main body 1 itself can be made smaller than that of the conventional device, which means it is possible to meet the present demand for reduction in size of measuring devices. In the first embodiment, when, after one switch 29 has been activated, another switch 29 is activated, a measured value which has been displayed on the basis of the function of the first switch 29 is automatically cleared. It is therefore unnecessary to provide a switch for clearing a numerical value displayed on the second display section 4D. The drive contact 18 has a convex distal end and is provided in such a manner as to project from the inner end surface of the peripheral edge of the second member 3, while the switch elements 15 are buried in the inner end surface of the pripheral edge of the first member 2. Accordingly, the connection between the switch elements 15 and the drive contact 18 is effected smoothly in response to the relative rotation between the first and second members 2 and 3.

Figure 7:
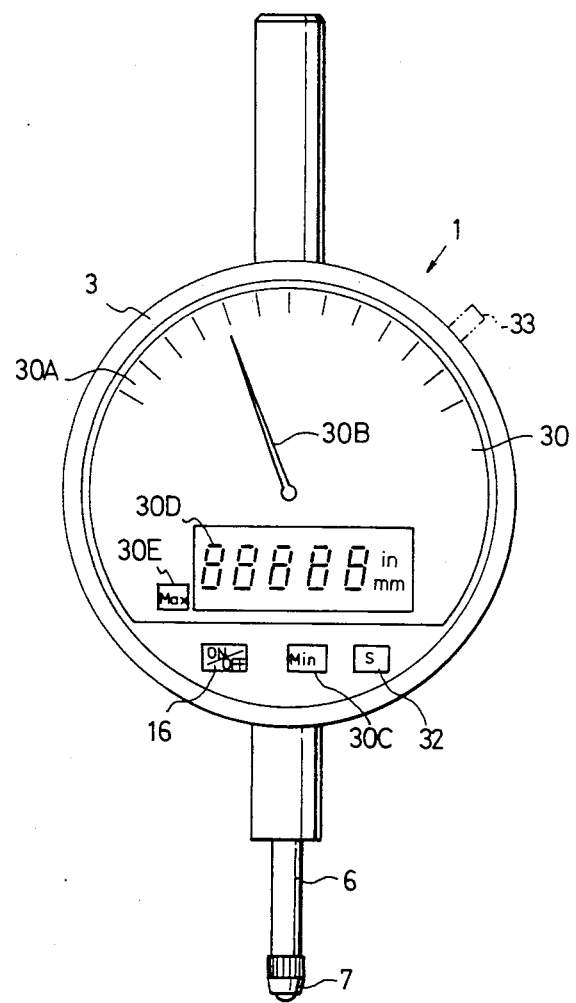
FIG. 7 is a front view of a second embodiment of the present invention.
Figure 8:
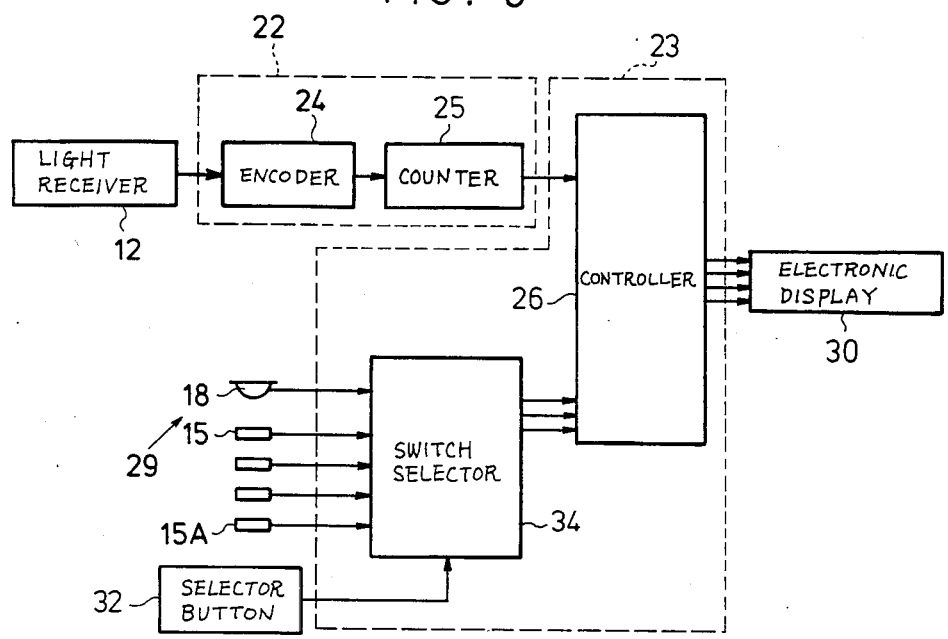
FIG. 8 is a block diagram showing the second embodiment.

FIGS. 7 and 8 show in combination a second embodiment of the present invention. In the following description, constituent elements which are identical or equal to those in the first embodiment are denoted by the same reference numerals, and description thereof is omitted or simplified.

The second embodiment differs from the first embodiment in that a measured value is displayed in both analog and digital forms and a selector switch is provided in place of the timer 28, but the arrangement of the other part of the second embodiment is substantially the same as that of the first embodiment.

Referring to FIG. 7, an electronic display 30 is provided on the second member 3 constituting the main body 1. The electronic display 30 has a display screen 30A which includes an analog display section 30B which effects real-time display of a measured value varying with the displacement of the spindle 6 in analog form, a selected factor display section 30E for displaying a selected measuring factor by liquid crystal in response to selection of the corresponding switch element 15, and a second display section 30D for digitally displaying a measured value obtained on the basis of the selected measuring factor. A power switch 16 is provided on the outer end surface of the second member 3 in a manner similar to that in the first embodiment. Further, a connected switch element display section 30C and a selector button 32 are provided on the outer end surface of the second member 3. The display section 30C displays by liquid crystal the name of a switch element 15 which is presently connected to the drive contact 18. The selector button 32 may be provided on the outer peripheral surface of the second member 3 as shown by the broken line 33. Although not shown in FIG. 7, the main body 1 in the second embodiment is also provided therein with the switch elements 15, the drive contact 18, a flat cable, first and second electrical equipments 22 and 23, etc., and the switch elements 15 are arranged on a circular locus with its center at the center of the relative rotation between the first and second members 2 and 3 (see FIGS. 2 to 5), in a manner similar to that in the first embodiment.

The first electrical equipment 22 in the second embodiment, which corresponds to the first electrical equipment 22 shown in FIG. 2, includes an encoder 24 and a counter 25, and the second electrical equipment 23 in the second embodiment includes a controller 26 and a switch selector 34, as shown in the block diagram of FIG. 8. The respective functions of the encoder 24 and the like are substantially the same as those in the first embodiment, but the function of the switch selector 34 is different from that of the switch selector 27 in the first embodiment. More specifically, the switch selector 34 is connected with the selector button 32, the drive contact 18 and a predetermined number of switch elements 15 and arranged to deliver various signals to the electronic display 30 through the controller 26 so that, when any one of the switch elements 15 and the drive contact 18 are connected together, the switch selector 34 causes the name of the connected switch element 15 to be displayed on the display section 30C, and when the selector button 32 is pressed in this state, the switch element 15 concerned is selected, and the name of the selected switch element 15 is displayed on the selected factor display section 30E, while a measured value obtained on the basis of the selected measuring factor is displayed on the second display section 30D. When another switch element 15 and the drive contact 18 are connected together by rotating the first and second members 2 and 3 relative to each other, the name of the connected switch element 15 is displayed on the display section 30C. When, in this state, the selector button 32 is pressed, the switch element 15 concerned is selected, and a measuring factor corresponding to the selected switch element 15 is displayed on the display section 30E in place of the factor which has been displayed, while a measured value obtained on the basis of the selected measuring factor is displayed on the second display section 30D. On the other hand, a measured value which varies with the displacement of the spindle 6 is displayed on the analong display section 30 in a realtime manner through the encoder 24, the counter 25 and the controller 26. In the second embodiment, each switch 29 is defined by the drive contact 18, one switch element 15 and the selector button 32. The switch elements 15 include an inch/millimeter changing switch element 15A in a manner similar to that in the first embodiment. When this switch element 15A is selected, "in" or "mm" and a measured value obtained at that time are displayed on the second display section 30D.

The second embodiment, arranged as detailed above, provides advantages similar to those offered by the first embodiment and further enables any desired switch element 15 to be selected with the selector button 32, which means that the circuit configuration is simplified as compared with that in the first embodiment which employs the timer 28.

Figure 9:
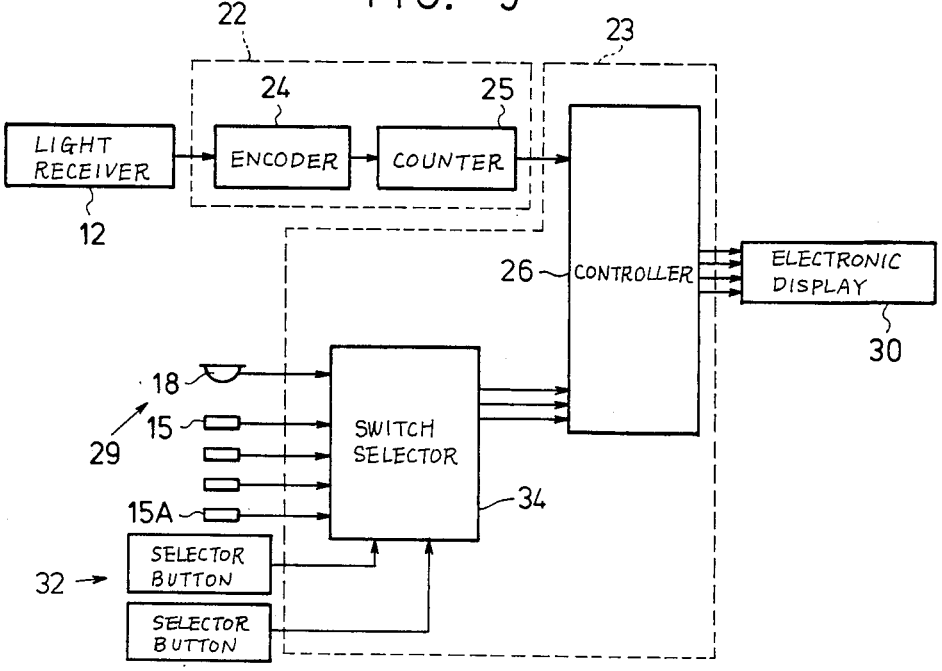
FIG. 9 is a block diagram showing a third embodiment of the present invention.
Figure 10:
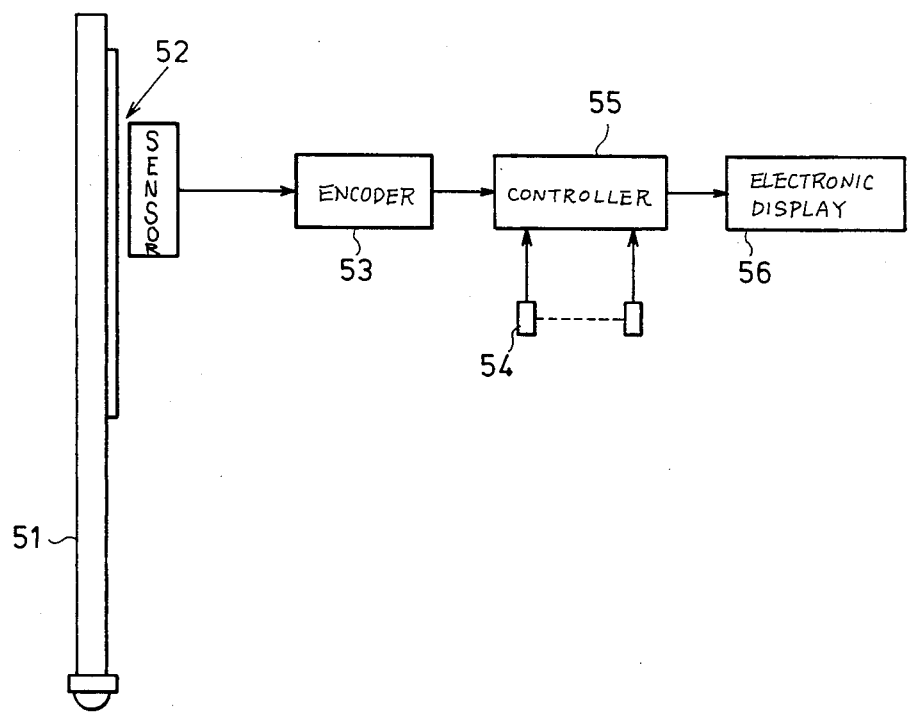
FIG. 10 is a block diagram showing a prior art.
Figure 11:
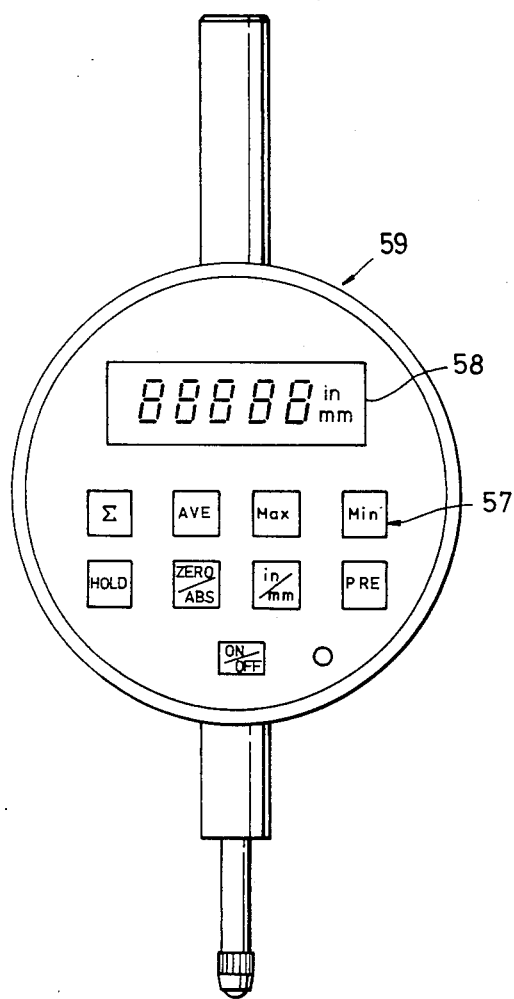
FIG. 11 is a front view of the prior art.

FIG. 9 shows a block diagram of a third embodiment of the present invention. The third embodiment is provided with two selector buttons 32, whereas the second embodiment is provided with one selector button 32. The arrangement of the other part of the third embodiment is substantially the same as that of the second embodiment. According to this embodiment, eight different switches can be selected by combining two selector buttons 32 and four switch elements 15, so that it is possible to select an increased number of swithes with a reduced number of switch elements 15.

Although in each of the above-described embodiments the electronic display measuring device according to the present invention is defined by a dial gauge, the invention is not necessarily limited thereto, and the present invention may be applied to other types of measuring device, for example, length measuring devices such as slide calipers and height gauges, weight measuring devices arranged such that a spindle is displaced in response to weight, and speedometers wherein a speed is measured from the amount of displacement of a spindle per unit of time. The switch 29 may be defined by any type of switch which can be activated utilizing the circumferential displacement between the first and second members 2 and 3. For example, the arrangement may be such that the outer periphery of the cylindrical portion of the first member 2 and the inner periphery of the cylindrical portion of the second member 3 are engaged so as to be rotatable relative to each other, and the switch elements 15 and the drive contact 18 are respectively provided on said outer and inner peripheries. Each switch element 15 may be defined by, e.g., a micropush-button switch which has both fixed and movable contacts and functions as a switch alone, and in such case, the drive contact 18 may be defined by a mere projection which is adapted to bring the two contacts of each switch element 15 into contact with each other. Employment of micropush-button switches or the like enables avoidance of any contact failure which would otherwise be caused by a stain on the contacts. Each of the above-described embodiments may be provided with a measuring program and arranged such that it is possible to display an outline pattern of an object being measured, a dimension to be measured, the contact point of the measuring element 7, etc., and the electronic display 4 or 30 is also allowed to display the ordinal number of an operation in the program which is presently executed. With this arrangement, it is possible to further increase the number of display functions. If the power switch 16 and the like are provided on the peripheral surface of the main body 1, switches can be cleared from the outer end surface of the second member 3, and the display screen 4A or 30A can be further widened. The photoelectric encoder 24 is not necessarily limitative, and any type of encoder which is able to detect an amount of displacement may be employed, such as an electrostatic capacity type encoder or an electromagnetic type encoder, and the employed encoder may be of not only the linear type but also of the rotary type. Although each of the above-described embodiments is provided with no special means for allowing the operator to feel actually the registration between the drive contact 18 and each switch element 15, a click or registration mechanism having a general structure composed of a recess and a resilient projection may be provided between the first and second members 2 and 3, thereby allowing the operator to feel click or registration between the drive contact 18 and each switch element 15. Although in the first embodiment the factor display section 4C of the display screen 4A is formed by liquid crystal, the arrangement may be such that a lamp for each switch element 15 is provided and activated to flash so as to display a measuring factor corresponding to each switch element 15. However, employment of liquid crystal as in the case of the first embodiment enables the display screen 4A to be widened, so that it is easy to read numerical values displayed on the first and second display sections 4B and 4D. Further, the analog display section 30B in the second embodiment may be adapted to display a measured value by means of liquid crystal.

As has been described above, it is advantageously possible, according to the present invention, to allow the display screen of the electronic display measuring device to have an enlarged area on the main body.

What is claimed is:

1. An electronic display measuring device having an encoder incorporated in a main body, said encoder being adapted to convert a measurement variable into an electric signal, and an electronic display for displaying a measured value, said device comprising:

said main body including a first member provided with said encoder, and a second member provided with said electronic display, said first and second members being rotatable relative to each other so that the position of said electronic display is changeable; and a switch for controlling at least one of said encoder and said electronic display, said switch being provided so as to be actuated by utilizing a circumferential displacement between said first and second members which is caused when these members are rotated relative to each other.

2. An electronic display measuring device according to claim 1, wherein said switch includes a plurality of switch elements arranged on a circular locus with its center at the center of relative rotation between said first and second members, any one of said switch elements being selected on the basis of the fact that a selected one of said switch elements stays in a predetermined state for a predetermined period of time.

3. An electronic display measuring device according to claim 1, wherein said switch includes a plurality of switch elements arranged on a circular locus with its center at the center of relative rotation between said first and second members, and a selector button for selecting one of said switch elements.

4. An electronic display measuring device according to claim 3, wherein said selector button is defined by a plurality of selector buttons.

5. An electronic display measuring device according to claim 1, wherein said electronic display includes a digital display and an analog display.

6. An electronic display measuring device according to claim 1, wherein said electronic display includes a display section which effects real-time display of the amount of displacement of a spindle, and a display section for displaying a measured value corresponding to a predetermined switch element.

7. An electronic display measuring device according to claim 1, wherein said first and second members have respective cylindrical portions through which they are connected so as to be rotatable relative to each other.

8. An electronic display measuring device according to claim 1, wherein said first and second members are respectively provided with electrical equipment means for electrically processing the amount of displacement of a spindle, said electrical equipment means being connected together by a belt-shaped wiring.

9. An electronic display measuring device according to claim 8, wherein said belt-shaped wiring has a curvature equal to that of the circular locus defined by the relative rotation between said first and second members.

* * * * *